United States Patent
Fu et al.

(10) Patent No.: US 11,642,659 B2
(45) Date of Patent: May 9, 2023

(54) CATALYST FOR REMOVING VOLATILE ORGANIC COMPOUNDS AND PREPARATION METHOD THEREFOR

(71) Applicant: SOUTH CHINA UNIVERSITY OF TECHNOLOGY, Guangdong (CN)

(72) Inventors: Mingli Fu, Guangdong (CN); Qi Gan, Guangdong (CN); Hui He, Guangdong (CN); Junliang Wu, Guangdong (CN); Daiqi Ye, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 424 days.

(21) Appl. No.: 16/620,884

(22) PCT Filed: Nov. 27, 2017

(86) PCT No.: PCT/CN2017/113111
§ 371 (c)(1),
(2) Date: Dec. 10, 2019

(87) PCT Pub. No.: WO2018/227891
PCT Pub. Date: Dec. 20, 2018

(65) Prior Publication Data
US 2020/0197912 A1 Jun. 25, 2020

(30) Foreign Application Priority Data
Jun. 15, 2017 (CN) .......................... 201710451833.3

(51) Int. Cl.
*B01J 21/04* (2006.01)
*B01J 23/42* (2006.01)
(Continued)

(52) U.S. Cl.
CPC ............ *B01J 23/44* (2013.01); *B01D 53/865* (2013.01); *B01J 23/42* (2013.01); *B01J 35/04* (2013.01);
(Continued)

(58) Field of Classification Search
CPC ... B01J 21/04; B01J 23/42; B01J 23/44; B01J 23/56; B01J 35/04; B01J 37/0204; B01J 37/0213; B01J 37/0217; B01D 53/865
(Continued)

(56) References Cited

U.S. PATENT DOCUMENTS 4,708,946 A * 11/1987 Ohata ...................... B01J 35/04
423/213.5
5,015,617 A * 5/1991 Ohata .................. B01D 53/945
502/349
(Continued)

FOREIGN PATENT DOCUMENTS

CN 101069849 11/2007
CN 101602017 12/2009
(Continued)

OTHER PUBLICATIONS

"International Search Report (Form PCT/ISA/210) of PCT/CN2017/113111," dated Mar. 23, 2018,with English translation thereof, pp. 1-4.

*Primary Examiner* — Cam N. Nguyen
(74) *Attorney, Agent, or Firm* — JCIPRNET

(57) ABSTRACT

The invention discloses a catalyst for removing volatile organic compounds and a preparation method therefor. In the catalyst, aluminum oxide modified by iron, cobalt and nickel is used as a carrier, cordierite honeycomb ceramic is used as a matrix, and an extremely low content of a mixture of platinum and palladium is used as an active component; a molar ratio of platinum to palladium is 0-1:0-9, and an (Continued)

amount of the mixture of platinum and palladium accounts for 0.01% to 0.05% of a mass of the matrix; and an amount of the carrier accounts for 3% to 5% of the mass of the matrix.

10 Claims, 1 Drawing Sheet

(51) Int. Cl.
  *B01J 23/44* (2006.01)
  *B01J 23/56* (2006.01)
  *B01J 35/04* (2006.01)
  *B01J 37/02* (2006.01)
  *B01D 53/86* (2006.01)

(52) U.S. Cl.
  CPC ....... *B01J 37/0207* (2013.01); *B01J 37/0213* (2013.01); *B01J 37/0217* (2013.01); *B01D 2255/1021* (2013.01); *B01D 2255/1023* (2013.01); *B01D 2257/708* (2013.01); *B01J 21/04* (2013.01)

(58) Field of Classification Search
  USPC ................. 502/332–334, 339, 355, 415, 439
  See application file for complete search history.

(56) References Cited

U.S. PATENT DOCUMENTS

| | | | | |
|---|---|---|---|---|
| 5,106,802 | A * | 4/1992 | Horiuchi | B01J 35/1009 502/343 |
| 5,179,059 | A * | 1/1993 | Domesle | B01D 53/945 502/303 |
| 5,911,961 | A * | 6/1999 | Horiuchi | B01J 37/0248 502/313 |
| 6,811,868 | B2 * | 11/2004 | Hasegawa | C04B 35/195 428/210 |
| 7,713,911 | B2 * | 5/2010 | Wakamatsu | B01J 35/0013 502/328 |
| 9,427,732 | B2 * | 8/2016 | Yin | B01J 37/0228 |
| 9,475,003 | B2 * | 10/2016 | Hirose | B01J 37/0242 |
| 9,566,568 | B2 * | 2/2017 | Yin | B01J 35/02 |
| 9,579,638 | B2 * | 2/2017 | Fedeyko | B01D 46/24491 |
| 9,855,549 | B2 * | 1/2018 | Gao | B01J 35/1009 |
| 9,950,316 | B2 * | 4/2018 | Yin | B01J 21/04 |
| 10,335,776 | B2 * | 7/2019 | Sung | B01J 23/96 |
| 2010/0111781 | A1 * | 5/2010 | Takahashi | B01D 46/2486 422/186.21 |
| 2013/0150617 | A1 * | 6/2013 | Ma | B01J 23/894 560/190 |
| 2015/0224491 | A1 * | 8/2015 | Lee | C23C 24/085 428/116 |

FOREIGN PATENT DOCUMENTS

| | | |
|---|---|---|
| CN | 105964254 | 9/2016 |
| CN | 107335447 | 11/2017 |
| WO | 03101612 | 12/2003 |

* cited by examiner

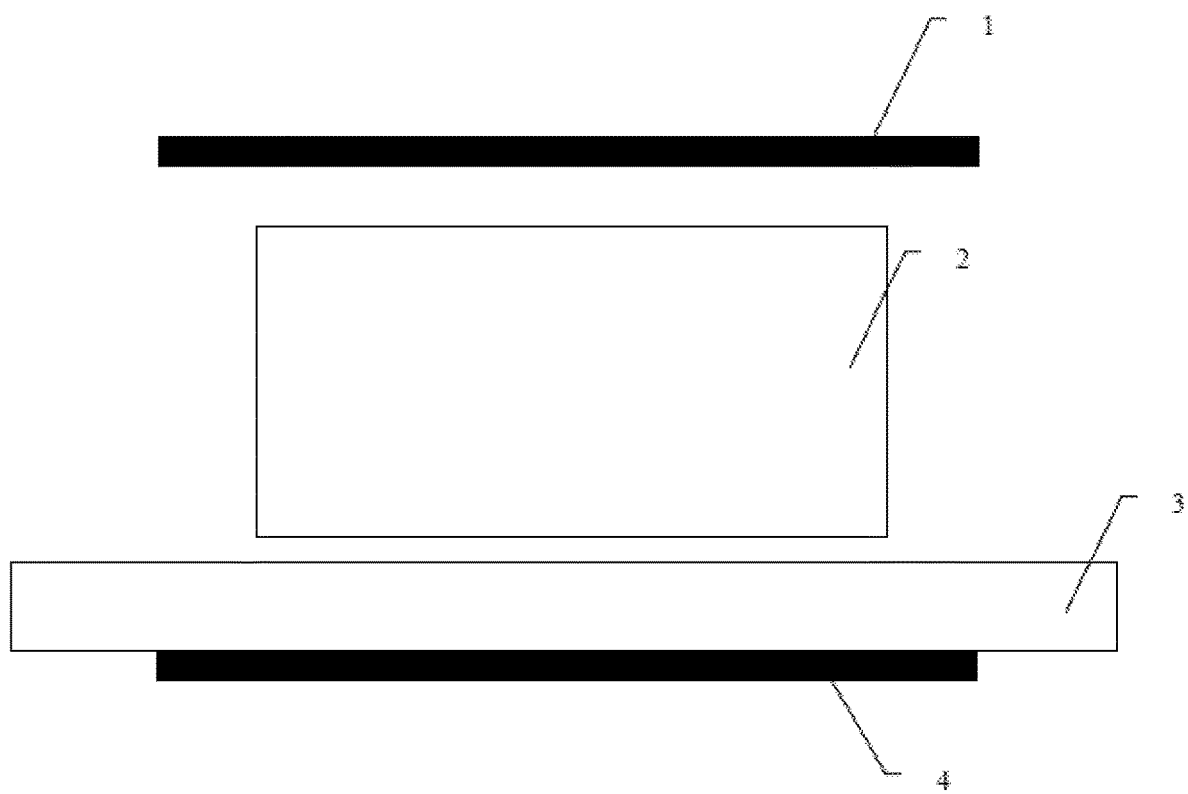

CATALYST FOR REMOVING VOLATILE ORGANIC COMPOUNDS AND PREPARATION METHOD THEREFOR

CROSS-REFERENCE TO RELATED APPLICATION

This application is a 371 of international application of PCT application serial no. PCT/CN2017/113111, filed on Nov. 27, 2017, which claims the priority benefit of China application no. 201710451833.3, filed on Jun. 15, 2017. The entirety of each of the above-mentioned patent applications is hereby incorporated by reference herein and made a part of this specification.

BACKGROUND

Technical Field

The present invention relates to the fields of atmospheric contamination control technologies and environment-friendly catalytic materials, and more particularly, to a catalyst for removing volatile organic compounds and a preparation method therefor.

Description of Related Art

Emission of volatile organic compounds (VOCs) directly affects human health and environmental quality. After secondary conversion, the VOCs can generate ozone ($O_3$) and fine particulate matter $PM_{2.5}$, which is the main cause to form haze. Since the VOCs will directly and indirectly cause great harm to the human health and ecological environment, the state has paid high attention to control the VOCs. Common VOCs control technologies mainly include a recovery method and a destruction method, wherein the destruction method mainly includes a combustion method, a biological method, a plasma method and a photocatalytic method. The combustion method is recognized as one of the most effective and thorough VOCs removing methods. However, the catalytic combustion method has been widely applied due to the introduction of catalyst, which reduces a reaction temperature and saves energy, and the technical core of the catalytic combustion method is the catalyst.

At present, a monolithic catalyst is generally used in catalytic oxidation, such as coating a $\gamma$-$Al_2O_3$ (aluminum oxide)-based carrier on a cordierite honeycomb ceramic matrix, and finally loading noble metal of platinum family and other active components. The catalyst and the preparation method therefor have two key points, wherein the first is the $\gamma$-$Al_2O_3$-based carrier, and the second is the noble metal of platinum family and other active components. The $\gamma$-$Al_2O_3$-based carrier mainly plays a role of highly dispersing the active components, ensuring the high activity and high temperature resistance of the catalyst, and has a performance of enabling the active components to be tightly combined with the matrix and the like; and the noble metal of platinum family and other active components directly provide the high activity of the catalyst.

At present, the $\gamma$-$Al_2O_3$-based carrier is prone to high temperature sintering, cracking and falling off in actual waste gas purification. Therefore, it is necessary to strengthen and optimize the performance of the carrier. Modified elements are mostly taken from rare earths such as lanthanide series metal, transition metal and the like, as well as cerium oxide, lanthanum oxide and zirconium oxide. In order to ensure the activity and stability of these catalysts, the active components such as noble metal of platinum family are essential, but a loading amount is usually higher, which is generally more than 0.05%, even as high as 1% to 5%. Certainly, there are also some catalysts containing the noble metal of active component less than 0.07% (a content of palladium in the catalyst ranges from 0.1 g/L to 0.4 g/L, converted from the catalyst), but the active component also contains nickel, and nitric acid and vacuum condition are used in the preparation process, so that the preparation process is relatively complicated. Therefore, the existing catalysts have the defects of too complicated modification, long preparation process, and high loading amount of noble metals, so that the cost is also higher.

SUMMARY

In order to overcome the defects of the existing catalyst for removing volatile organic compounds such as too complicated modification, long preparation process, and high loading amount of noble metals, which lead to higher cost, the present invention provides a catalyst for removing volatile organic compounds, which has a simple preparation process and an extremely low loading amount of noble metals. The catalyst includes a cordierite honeycomb ceramic matrix, a $\gamma$-$Al_2O_3$ carrier modified by iron, cobalt and nickel, and an extremely low content of a mixture of platinum and palladium as an active component.

The present invention further provides a method for preparing the catalyst for removing volatile organic compounds.

The present invention is achieved by the following technical solutions.

In a catalyst for removing volatile organic compounds, aluminum oxide modified by iron, cobalt and nickel is used as a carrier, cordierite honeycomb ceramic is used as a matrix, and an extremely low content of a mixture of platinum and palladium is used as an active component; the modified aluminum oxide carrier is coated on the cordierite honeycomb ceramic matrix, and the active component is loaded on the modified aluminum oxide carrier; a molar ratio of the platinum to the palladium is 0-1:0-9, and an amount of the mixture of platinum and palladium accounts for 0.01% to 0.05% of a mass of the matrix; and an amount of the carrier accounts for 3% to 5% of the mass of the matrix.

A method for preparing the catalyst for removing volatile organic compounds includes the following steps:

(1) Coating of the Carrier:

mixing a mixed solution of iron salt, cobalt salt and nickel salt with a water-soluble colloid of aluminum hydroxide to obtain a mixed liquid of the solution and the colloid; and impregnating the cordierite honeycomb ceramic into the mixed liquid of the solution and the colloid obtained, taking out the cordierite honeycomb ceramic, and drying and roasting the cordierite honeycomb ceramic in an air atmosphere to obtain a cordierite honeycomb ceramic matrix coated with the modified aluminum oxide;

(2) Discharge Strengthening Pretreatment:

placing the obtained cordierite honeycomb ceramic matrix coated with the modified aluminum oxide in a pulse dielectric barrier discharge reaction zone, and performing discharge strengthening pretreatment to obtain a discharge-strengthening pretreated cordierite honeycomb ceramic matrix coated with the modified aluminum oxide;

(3) Preparation of an Impregnation Liquid of the Active Component:

dissolving and mixing a precursor of platinum and a precursor of palladium with deionized water to obtain the impregnation liquid of the active component; and (4) Loading and Reduction of the Active Component:

impregnating the discharge-strengthening pretreated cordierite honeycomb ceramic matrix coated with the modified aluminum oxide obtained in the step (2) into the impregnation liquid of the active component obtained in the step (3), taking out the cordierite honeycomb ceramic matrix, removing the impregnation liquid remaining in a pore channel of the honeycomb ceramic matrix, drying and roasting the cordierite honeycomb ceramic matrix in an air atmosphere, and finally reducing the cordierite honeycomb ceramic matrix to obtain the catalyst for removing volatile organic compounds.

Further, in the step (1), a concentration of the mixed solution of iron salt, cobalt salt and nickel salt ranges from 2.62 g/mL to 4.64 g/mL.

Further, in the step (1), a concentration of the water-soluble colloid of aluminum hydroxide ranges from 3.25 g/mL to 4.93 g/mL.

Further, in the step (1), the iron salt, the cobalt salt and the nickel salt are nitrate or acetate of iron, cobalt and nickel.

Further, in the step (1), in the mixed liquid of the solution and the colloid, a molar ratio of the iron to the cobalt, the nickel and the aluminum is 1-2: 1-2:1-2: 4-7.

Further, in the step (1), the impregnating lasts for 20 minutes to 30 minutes.

Further, in the step (1), the drying is performed at 120° C. for 3 hours to 6 hours.

Further, in the step (1), the roasting is performed at 500° C. to 700° C. for 1 hour to 3 hours.

Further, in the step (2), the discharge strengthening pretreatment is as follows: discharge conditions are that, under an atmospheric pressure, a dielectric thickness ranges from 1 mm to 5 mm, a voltage ranges from 5000 V to 20000 V, a frequency ranges from 50 Hz to 400 Hz, and a pulse width ranges from 100 ns to 200 ns.

Further, in the step (2), the strengthening pretreatment lasts for 5 minutes to 10 minutes.

Further, in the step (3), the precursor of the platinum is chloroplatinic acid.

Further, in the step (3), the precursor of the palladium is palladium chloride.

Further, in the step (3), a total content of the platinum and the palladium in the impregnation liquid of the active component ranges from 1.65 g/L to 8.26 g/L.

Further, in the step (4), the impregnating lasts for 20 minutes to 30 minutes.

Further, in the step (4), the drying is performed at 120° C. for 3 hours to 6 hours.

Further, in the step (4), the roasting is performed at 500° C. to 700° C. for 1 hour to 3 hours.

Further, in the step (4), the reducing is performed in an $H_2/N_2$ atmosphere, and preferably, a volume ratio of $H_2$ to $N_2$ is 5:95 in the $H_2/N_2$ atmosphere.

Further, in the step (4), the reducing is performed at 200° C. to 250° C. for 2 hours to 4 hours.

Compared with the prior art, the present invention has the following advantages and beneficial effects:

(1) according to the present invention, the $\gamma$-$Al_2O_3$ modified by iron, cobalt and nickel is used as the carrier and an extremely low content of the mixture of platinum and palladium is used as the active component, thus overcoming the defects of the existing catalyst for removing volatile organic compounds such as too complicated modification, long preparation process, and high loading amount of noble metals, which lead to higher cost;

(2) according to the present invention, in the preparation process of the catalyst, the cordierite honeycomb ceramic matrix coated with the modified aluminum oxide is placed in the pulse dielectric barrier discharge reaction zone to perform the strengthening pretreatment, so that the process is simple, and the activity of the catalyst is further improved;

(3) according to the catalyst of the present invention, in terms of performance, the noble metal of the active component has high dispersion, and the active component is tightly combined with the matrix, thus ensuring the excellent performances of the catalyst such as high activity, high temperature resistance and the like; and (4) the catalyst of the present invention has good low-temperature activity and excellent high-temperature resistance, and completely oxidizes toluene at 230° C.; and complete oxidation of the toluene can be realized at 255° C. after 200 hours of continuous operation at 500° C. to 700° C.

BRIEF DESCRIPTION OF THE DRAWINGS

FIG. 1 is a schematic diagram of a device for pulse dielectric barrier discharge strengthening pretreatment.

DESCRIPTION OF THE EMBODIMENTS

The method for preparing the catalyst is further described in detail hereinafter with reference to the specific embodiments, and meanwhile, performance test results of the method are described in detail, but the present invention is not limited to these embodiments.

A schematic diagram of a device for pulse dielectric barrier discharge strengthening pretreatment used in the embodiments of the present invention is shown in FIG. 1, which includes a high-voltage electrode 1, a dielectric 3 and a grounding electrode 4, cordierite honeycomb ceramic coated with an aluminum oxide carrier modified by iron, cobalt and nickel is used as a matrix 2 and placed in a reaction zone between the high-voltage electrode 1 and the dielectric 3, wherein discharge conditions are that, under an atmospheric pressure, a dielectric thickness ranges from 1 mm to 5 mm, a voltage ranges from 5000 V to 20000 V, a frequency ranges from 50 Hz to 400 Hz, and a pulse width ranges from 100 ns to 200 ns. Under the conditions above, strengthening pretreatment to the cordierite honeycomb ceramic coated with the aluminum oxide carrier modified by iron, cobalt and nickel as the matrix 2 in a pulse dielectric barrier discharge reaction zone lasts for 5 minutes to 10 minutes.

Embodiment 1

(1) Coating of Modified Aluminum Oxide on a Cordierite Honeycomb Ceramic Matrix

A mixed solution of iron salt, cobalt salt and nickel salt was mixed with a water-soluble colloid of aluminum hydroxide, wherein the iron salt, the cobalt salt and the nickel salt were $Fe(NO_3)_3 \cdot 9H_2O$, $Co(AC)_3 \cdot 4H_2O$ and $Ni(NO_3)_4 \cdot 6H_2O$. Specifically, 22.5231 g of $Fe(NO_3)_3 \cdot 9H_2O$, 13.8872 g of $Co(AC)_3 \cdot 4H_2O$ and 16.0482 g of $Ni(NO_3)_4 \cdot 6H_2O$ were dissolved in 20 mL of deionized water, and mixed with a colloid containing 20 mL of deionized water and 65.0166 g of aluminum hydroxide, and then magnetically stirred. In the mixed liquid prepared, a molar ratio of iron to cobalt, nickel and aluminum was 1:1:1:7.

Cordierite honeycomb ceramic was impregnated into the mixed liquid of the salt solutions and the colloid above for 20 minutes, and coated with the modified aluminum oxide with a coating amount accounting for 3% of a mass of the matrix, and finally, the cordierite honeycomb ceramic was dried at 120° C. for 3 hours and roasted at 500° C. for 3 hours in an air atmosphere to obtain the cordierite honeycomb ceramic matrix coated with the modified aluminum oxide.

(2) Discharge Strengthening Pretreatment to the Cordierite Honeycomb Ceramic Matrix Coated with the Modified Aluminum Oxide.

The cordierite honeycomb ceramic matrix coated with the modified aluminum oxide obtained in the step (1) was placed in a pulse dielectric barrier discharge reaction zone to obtain a discharge-strengthening pretreated cordierite honeycomb ceramic matrix coated with the modified aluminum oxide, wherein the discharge conditions were as follows: under an atmospheric pressure, a dielectric thickness was 1 mm, a voltage was 5000 V, a frequency was 50 Hz, a pulse width was 100 ns, and the strengthening pretreatment lasted for 5 minutes.

(3) Preparation of an Impregnation Liquid of an Active Component

An impregnation liquid of an active component of a mixture of platinum and palladium was prepared, wherein chloroplatinic acid and palladium chloride were respectively dissolved with deionized water, and then mixed, and the platinum and the palladium were prepared in a molar ratio of 1:9. Specifically, 0.0915 g of $PdCl_2$ and 0.0297 g of $H_2PtCl_6 \cdot 6H_2O$ were dissolved in 40 mL of water to obtain the impregnation liquid of the active component containing 1.65 g/L of the mixture of platinum and palladium.

(4) Loading and Reduction of the Active Component

The pulse dielectric barrier discharge-strengthening pretreated cordierite honeycomb ceramic matrix coated with the modified aluminum oxide obtained in the step (2) was impregnated into the impregnation liquid of the active component obtained in the step (3) for 20 minutes, then the cordierite honeycomb ceramic matrix was taken out, and the impregnation liquid remaining in a pore channel of the honeycomb ceramic matrix was removed, then the cordierite honeycomb ceramic matrix was dried at 120° C. for 3 hours and roasted at 500° C. for 3 hours in an air atmosphere, and finally the cordierite honeycomb ceramic matrix was reduced at 200° C. for 4 hours in an $H_2/N_2$ atmosphere ($H_2/N_2$=5:95, V/V) to obtain a catalyst using an extremely low content of the mixture of platinum and palladium as the active component, wherein the active component accounted for 0.01% of the mass of the matrix.

(5) Performance Evaluation of the Catalyst

Pd—Pt/Fe—Co—Ni—O-γ-$Al_2O_3$/cordierite honeycomb ceramic with a size of 100 mm×100 mm×50 mm was cut into four cylinders with a size of 30 mm (diameter)×50 mm (length), and any one of the four cylinders was loaded into a catalytic reactor.

The performance evaluation of the catalyst was performed in a fixed bed flow reactor, toluene was used as a representative of volatile organic compounds, and immersed in an ice-water mixture for thermal insulation, and air bubbles were used to carry out a toluene-air mixture to form simulated exhaust gas, wherein a content of the toluene was 3490±50 mg·m$^{-3}$ and a reaction airspeed was controlled at 15000 h$^{-1}$. Concentrations of the toluene at an inlet and an outlet of an evaluation device were analyzed by FID of a gas chromatograph GC2014C.

A conversion rate of the toluene was calculated by a following formula:

conversion rate of toluene(Conv,%)=[(concentration of inlet toluene $Conc_i$–concentration of outlet toluene $Conc_o$)/concentration of inlet toluene $Conc_i$]×100%.

At each temperature, composition analysis was performed, 5 minutes after a catalytic oxidation reaction reached a stable state.

According to the catalyst prepared in the embodiment, $Conc_i$=3540 mg·m$^{-3}$, $Conc_o$=36 mg·m$^{-3}$ and the conversion rate of the toluene Conv was 98.98% at 230° C.

After the catalyst prepared in the embodiment was continuously operated at 500° C. for 200 hours, a catalytic oxidation reaction test was performed on the toluene at 250° C., and test results were as follows: $Conc_i$=3535 mg·m$^{-3}$, $Conc_o$=39 mg·m$^{-3}$, and the conversion rate of the toluene Conv was 98.90%.

Embodiment 2

(1) Coating of Modified Aluminum Oxide on a Cordierite Honeycomb Ceramic Matrix

A mixed solution of iron salt, cobalt salt and nickel salt was mixed with a water-soluble colloid of aluminum hydroxide, wherein the iron salt, the cobalt salt and the nickel salt were $Fe(NO_3)_3 \cdot 9H_2O$, $Co(AC)_3 \cdot 4H_2O$ and $Ni(NO_3)_4 \cdot 6H_2O$. Specifically, 39.9530 g of $Fe(NO_3)_3 \cdot 9H_2O$, 24.6339 g of $Co(AC)_3 \cdot 4H_2O$ and 28.4672 g of $Ni(NO_3)_4 \cdot 6H_2O$ were dissolved in 25 mL of deionized water, and mixed with a colloid containing 15 mL of deionized water and 60.4111 g of aluminum hydroxide, and then magnetically stirred. In the mixed liquid prepared, a molar ratio of iron to cobalt, nickel and aluminum was 1.5:1.5:1.5:5.5.

Cordierite honeycomb ceramic was impregnated into the mixed liquid of the salt solutions and the colloid above for 25 minutes, and coated with the modified aluminum oxide with a coating amount accounting for 4% of a mass of the matrix, and finally, the cordierite honeycomb ceramic was dried at 120° C. for 4 hours and roasted at 600° C. for 2 hours in an air atmosphere to obtain the cordierite honeycomb ceramic matrix coated with the modified aluminum oxide.

(2) Discharge Strengthening Pretreatment to the Cordierite Honeycomb Ceramic Matrix Coated with the Modified Aluminum Oxide The cordierite honeycomb ceramic matrix coated with the modified aluminum oxide obtained in the step (1) was placed in a pulse dielectric barrier discharge reaction zone to obtain a discharge-strengthening pretreated cordierite honeycomb ceramic matrix coated with the modified aluminum oxide, wherein the discharge conditions were as follows: under an atmospheric pressure, a dielectric thickness was 3 mm, a voltage was 10000 V, a frequency was 200 Hz, a pulse width was 150 ns, and the strengthening pretreatment lasted for 8 minutes.

(3) Preparation of an Impregnation Liquid of an Active Component

An impregnation liquid of an active component of palladium was prepared, wherein palladium chloride was dissolved with deionized water. Specifically, 0.3303 g of $PdCl_2$ was dissolved in 40 mL of water to obtain the impregnation liquid of the active component containing 4.95 g/L of the palladium.

(4) Loading and Reduction of the Active Component

The pulse dielectric barrier discharge-strengthening pretreated cordierite honeycomb ceramic matrix coated with the modified aluminum oxide obtained in the step (2) was impregnated into the impregnation liquid of the active component obtained in the step (3) for 25 minutes, then the cordierite honeycomb ceramic matrix was taken out, and the impregnation liquid remaining in a pore channel of the honeycomb ceramic matrix was removed, then the cordierite honeycomb ceramic matrix was dried at 120° C. for 4 hours and roasted at 600° C. for 2 hours in an air atmosphere, and finally the cordierite honeycomb ceramic matrix was reduced at 225° C. for 3 hours in an $H_2/N_2$ atmosphere ($H_2/N_2$=5:95, V/V) to obtain a catalyst using an extremely low content of the palladium as the active component, wherein the active component accounted for 0.03% of the mass of the matrix.

(5) Performance Evaluation of the Catalyst

Pd/Fe—Co—Ni—O-γ-$Al_2O_3$/cordierite honeycomb ceramic with a size of 100 mm×100 mm×50 mm was cut into four cylinders with a size of 30 mm (diameter)×50 mm (length), and any one of the four cylinders was loaded into a catalytic reactor.

The performance evaluation of the catalyst was performed in a fixed bed flow reactor, toluene was used as a representative of volatile organic compounds, and immersed in an ice-water mixture for thermal insulation, and air bubbles were used to carry out a toluene-air mixture to form simulated exhaust gas, wherein a content of the toluene was 3490±50 mg·m$^{-3}$ and a reaction airspeed was controlled at 15000 h$^{-1}$. Concentrations of the toluene at an inlet and an outlet of an evaluation device were analyzed by FID of a gas chromatograph GC2014C.

A conversion rate of the toluene was calculated by a following formula:

conversion rate of toluene(Conv,%)=[(concentration of inlet toluene Conc$_i$−concentration of outlet toluene Conc$_o$)/concentration of inlet toluene Conc$_i$]×100%.

At each temperature, composition analysis was performed, 5 minutes after a catalytic oxidation reaction reached a stable state.

According to the catalyst prepared in the embodiment, Conc$_i$=3490 mg·m$^{-3}$, Conc$_o$=30 mg·m$^{-3}$ and the conversion rate of the toluene Conv was 99.14% at 230° C.

After the catalyst prepared in the embodiment was continuously operated at 600° C. for 200 hours, a catalytic oxidation reaction test was performed on the toluene at 255° C., and test results were as follows: Conc$_i$=3480 mg·m$^{-3}$, Conc$_o$=35 mg·m$^{-3}$, and the conversion rate of the toluene Conv was 98.99%.

Embodiment 3

(1) Coating of Modified Aluminum Oxide on a Cordierite Honeycomb Ceramic Matrix

A mixed solution of iron salt, cobalt salt and nickel salt was mixed with a water-soluble colloid of aluminum hydroxide, wherein the iron salt, the cobalt salt and the nickel salt were $Fe(NO_3)_3$·$9H_2O$, $Co(AC)_3$·$4H_2O$ and $Ni(NO_3)_4$·$6H_2O$. Specifically, 59.8240 g of $Fe(NO_3)_3$·$9H_2O$, 36.8859 g of $Co(AC)_3$·$4H_2O$ and 42.6257 g of $Ni(NO_3)_4$·$6H_2O$ were dissolved in 30 mL of deionized water, and mixed with a colloid containing 10 mL of deionized water and 49.3404 g of aluminum hydroxide, and then magnetically stirred. In the mixed liquid prepared, a molar ratio of iron to cobalt, nickel and aluminum was 2:2:2:4.

Cordierite honeycomb ceramic was impregnated into the mixed liquid of the salt solutions and the colloid above for 30 minutes, and coated with the modified aluminum oxide with a coating amount accounting for 5% of a mass of the matrix, and finally, the cordierite honeycomb ceramic was dried at 120° C. for 6 hours and roasted at 700° C. for 1 hour in an air atmosphere to obtain the cordierite honeycomb ceramic matrix coated with the modified aluminum oxide.

(2) Discharge Strengthening Pretreatment to the Cordierite Honeycomb Ceramic Matrix Coated with the Modified Aluminum Oxide The cordierite honeycomb ceramic matrix coated with the modified aluminum oxide obtained in the step (1) was placed in a pulse dielectric barrier discharge reaction zone to obtain a discharge-strengthening pretreated cordierite honeycomb ceramic matrix coated with the modified aluminum oxide, wherein the discharge conditions were as follows: under an atmospheric pressure, a dielectric thickness was 5 mm, a voltage was 20000 V, a frequency was 400 Hz, a pulse width was 200 ns, and the strengthening pretreatment lasted for 10 minutes.

(3) Preparation of an Impregnation Liquid of an Active Component

An impregnation liquid of an active component of palladium was prepared, wherein chloroplatinic acid was dissolved with deionized water. Specifically, 0.8770 g of $H_2PtCl_6$·$6H_2O$ was dissolved in 40 mL of water to obtain the impregnation liquid of the active component containing 8.26 g/L of the platinum.

(4) Loading and Reduction of the Active Component

The pulse dielectric barrier discharge-strengthening pretreated cordierite honeycomb ceramic matrix coated with the modified aluminum oxide obtained in the step (2) was impregnated into the impregnation liquid of the active component obtained in the step (3) for 30 minutes, then the cordierite honeycomb ceramic matrix was taken out, and the impregnation liquid remaining in a pore channel of the honeycomb ceramic matrix was removed, then the cordierite honeycomb ceramic matrix was dried at 120° C. for 6 hours and roasted at 700° C. for 1 hour in an air atmosphere, and finally the cordierite honeycomb ceramic matrix was reduced at 250° C. for 2 hours in an $H_2/N_2$ atmosphere ($H_2/N_2$=5:95, V/V) to obtain a catalyst using an extremely low content of the platinum as the active component, wherein the active component accounted for 0.05% of the mass of the matrix.

(5) Performance Evaluation of the Catalyst

Pt/Fe—Co—Ni—O-γ-$Al_2O_3$/cordierite honeycomb ceramic with a size of 100 mm×100 mm×50 mm was cut into four cylinders with a size of 30 mm (diameter)×50 mm (length), and any one of the four cylinders was loaded into a catalytic reactor.

The performance evaluation of the catalyst was performed in a fixed bed flow reactor, toluene was used as a representative of volatile organic compounds, and immersed in an ice-water mixture for thermal insulation, and air bubbles were used to carry out a toluene-air mixture to form simulated exhaust gas, wherein a content of the toluene was 3490±50 mg·m$^{-3}$ and a reaction airspeed was controlled at 15000 h$^{-1}$. Concentrations of the toluene at an inlet and an outlet of an evaluation device were analyzed by FID of a gas chromatograph GC2014C.

A conversion rate of the toluene was calculated by a following formula:

conversion rate of toluene(Conv,%)=[(concentration of inlet toluene $Conc_i$–concentration of outlet toluene $Conc_o$)/concentration of inlet toluene $Conc_i$]×100%.

At each temperature, composition analysis was performed, 5 minutes after a catalytic oxidation reaction reached a stable state.

According to the catalyst prepared in the embodiment, $Conc_i$=3440 mg·m$^{-3}$, $Conc_o$=20 mg·m$^{-3}$ and the conversion rate of the toluene Conv was 99.71% at 230° C.

After the catalyst prepared in the embodiment was continuously operated at 700° C. for 200 hours, a catalytic oxidation reaction test was performed on the toluene at 255° C., and test results were as follows: $Conc_i$=3460 mg·m$^{-3}$, $Conc_o$=30 mg·m$^{-3}$, and the conversion rate of the toluene Conv was 99.13%.

It can be seen from the embodiments above that the monolithic catalyst of the present invention has a high catalytic activity in removing volatile organic compounds represented by the toluene at a lower temperature. Even after continuous operation at 500° C. to 700° C. for 200 hours, the catalyst still maintains the ability to completely oxidize the toluene at 255° C. Moreover, the catalyst of the present invention has simple preparation process, extremely low content of noble metals, high thermal stability, low manufacturing cost, easy popularization and wide application prospect.

What is claimed is:

1. A catalyst for removing volatile organic compounds, wherein aluminum oxide modified by iron, cobalt and nickel is used as a carrier, cordierite honeycomb ceramic is used as a matrix, and a mixture of platinum and palladium is used as an active component; a modified aluminum oxide carrier is coated on a cordierite honeycomb ceramic matrix, and the active component is loaded on the modified aluminum oxide carrier; and a molar ratio of platinum to palladium is 0-1: 0-9, and an amount of the mixture of platinum and palladium accounts for 0.01% to 0.05% of a mass of the matrix; and an amount of the carrier accounts for 3% to 5% of the mass of the matrix.

2. A method for preparing a catalyst for removing volatile organic compounds, wherein the catalyst comprises aluminum oxide modified by iron, cobalt and nickel used as a carrier, cordierite honeycomb ceramic used as a matrix, and a mixture of platinum and palladium used as an active component; a modified aluminum oxide carrier is coated on a cordierite honeycomb ceramic matrix, and the active component is loaded on the modified aluminum oxide carrier; and a molar ratio of platinum to palladium is 0-1: 0-9, and an amount of the mixture of platinum and palladium accounts for 0.01% to 0.05% of a mass of the matrix; and an amount of the carrier accounts for 3% to 5% of the mass of the matrix, wherein the method comprises following steps:

(1) coating of the carrier:

mixing mixed solution of iron salt, cobalt salt and nickel salt with a water-soluble colloid of aluminum hydroxide to obtain mixed liquid of the solution and the colloid; and impregnating the cordierite honeycomb ceramic into the mixed liquid of the solution and the colloid obtained, removing the cordierite honeycomb ceramic, and drying and roasting the cordierite honeycomb ceramic in an air atmosphere to obtain the cordierite honeycomb ceramic matrix coated with the modified aluminum oxide;

(2) discharge strengthening pretreatment:

placing the obtained cordierite honeycomb ceramic matrix coated with the modified aluminum oxide in a pulse dielectric barrier discharge reaction zone, and performing the discharge strengthening pretreatment to obtain a discharge-strengthening pretreated cordierite honeycomb ceramic matrix coated with the modified aluminum oxide;

(3) preparation of an impregnation liquid of the active component:

dissolving and mixing a precursor of platinum and a precursor of palladium with deionized water to obtain the impregnation liquid of the active component; and (4) loading and reduction of the active component:

impregnating the discharge-strengthening pretreated cordierite honeycomb ceramic matrix coated with the modified aluminum oxide obtained in the step (2) into the impregnation liquid of the active component obtained in the step (3), removing the cordierite honeycomb ceramic matrix, removing the impregnation liquid remaining in a pore channel of the honeycomb ceramic matrix, drying and roasting the cordierite honeycomb ceramic matrix in an air atmosphere, and finally reducing the cordierite honeycomb ceramic matrix to obtain the catalyst for removing the volatile organic compounds.

3. The method for preparing the catalyst for removing the volatile organic compounds according to claim 2, wherein in the step (1), a concentration of the mixed solution of the iron salt, the cobalt salt and the nickel salt ranges from 2.62 g/mL to 4.64 g/mL; and a concentration of the water-soluble colloid of aluminum hydroxide ranges from 3.25 g/mL to 4.93 g/mL.

4. The method for preparing the catalyst for removing the volatile organic compounds according to claim 2, wherein in the step (1), the iron salt, the cobalt salt and the nickel salt are nitrate or acetate of iron, cobalt and nickel; and in the mixed liquid of the solution and the colloid, a molar ratio of the iron to the cobalt, the nickel and the aluminum is 1-2: 1-2: 1-2: 4-7.

5. The method for preparing the catalyst for removing the volatile organic compounds according to claim 2, wherein in the step (1), the impregnating lasts for 20 minutes to 30 minutes; the drying is performed at 120° C. for 3 hours to 6 hours; and the roasting is performed at 500° C. to 700° C. for 1 hour to 3 hours.

6. The method for preparing the catalyst for removing the volatile organic compounds according to claim 2, wherein in the step (2), the discharge strengthening pretreatment is as follows: discharge conditions are that, under an atmospheric pressure, a dielectric thickness ranges from 1 mm to 5 mm, a voltage ranges from 5000 V to 20000 V, a frequency ranges from 50 Hz to 400 Hz, a pulse width ranges from 100 ns to 200 ns, and the strengthening pretreatment lasts for 5 minutes to 10 minutes.

7. The method for preparing the catalyst for removing the volatile organic compounds according to claim 2, wherein in the step (3), the precursor of platinum is chloroplatinic acid; and the precursor of palladium is palladium chloride.

8. The method for preparing the catalyst for removing the volatile organic compounds according to claim 2, wherein in the step (3), a total content of platinum and palladium in the impregnation liquid of the active component ranges from 1.65 g/L to 8.26 g/L.

9. The method for preparing the catalyst for removing the volatile organic compounds according to claim 2, wherein in the step (4), the impregnating lasts for 20 minutes to 30 minutes; the drying is performed at 120° C. for 3 hours to 6 hours; and the roasting is performed at 500° C. to 700° C. for 1 hour to 3 hours.

10. The method for preparing the catalyst for removing the volatile organic compounds according to claim 2, wherein in the step (4), the reducing is performed in an $H_2/N_2$ atmosphere at 200° C. to 250° C. for 2 hours to 4 hours.

* * * * *